(12) United States Patent
Osawa (10) Patent No.: US 10,363,781 B2
(45) Date of Patent: Jul. 30, 2019

(54) TIRE

(71) Applicant: Sumitomo Rubber Industries, Ltd., Kobe-shi, Hyogo (JP)

(72) Inventor: Eiki Osawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 242 days.

(21) Appl. No.: 15/266,040

(22) Filed: Sep. 15, 2016

(65) Prior Publication Data

US 2017/0113493 A1 Apr. 27, 2017

(30) Foreign Application Priority Data

Oct. 26, 2015 (JP) .................. 2015-210057

(51) Int. Cl.
*B60C 11/12* (2006.01)
*B60C 11/03* (2006.01)

(52) U.S. Cl.
CPC ...... *B60C 11/1259* (2013.01); *B60C 11/0302* (2013.01); *B60C 11/0304* (2013.01);
(Continued)

(58) Field of Classification Search
CPC ............ B60C 11/0304; B60C 11/0306; B60C 11/1236; B60C 2011/0348; B60C 2011/0381
(Continued)

(56) References Cited

U.S. PATENT DOCUMENTS

| 5,660,651 A | 8/1997 | Diensthuber |
| 2008/0236714 A1 | 10/2008 | Kojima |

(Continued)

FOREIGN PATENT DOCUMENTS

| DE | 10311430 | * | 9/2004 |
| EP | 0669216 A1 | | 8/1995 |

(Continued)

OTHER PUBLICATIONS

English machine translation of JP2003-226116. (Year: 2003).*

(Continued)

*Primary Examiner* — Robert C Dye
(74) *Attorney, Agent, or Firm* — Birch, Stewart, Kolasch & Birch LLP (57) ABSTRACT

A tire includes a tread portion provided with a plurality of circumferentially and continuously extending main grooves including an outboard shoulder main groove, an outboard middle main groove, an inboard main groove and an inboard middle groove to define an outboard middle portion, an inboard middle portion and a central portion. The outboard middle portion is provided with a plurality of outboard middle lateral grooves, a plurality of outboard middle circumferential sipes each extending between adjacent outboard middle lateral grooves, and a plurality of outboard middle lateral sipes. The inboard middle portion is provided with a plurality of inboard middle lateral grooves, a plurality of inboard middle circumferential sipes, and a plurality of inboard middle lateral sipes. The number of inboard middle lateral sipes is greater than the number of the outboard middle lateral sipes.

12 Claims, 6 Drawing Sheets

(52) U.S. Cl.
CPC ....... *B60C 11/0306* (2013.01); *B60C 11/1263* (2013.01); *B60C 2011/0341* (2013.01); *B60C 2011/0344* (2013.01); *B60C 2011/0348* (2013.01); *B60C 2011/0358* (2013.01); *B60C 2011/0381* (2013.01); *B60C 2011/0386* (2013.01); *B60C 2011/1209* (2013.01); *B60C 2011/1268* (2013.01)

(58) Field of Classification Search
USPC ................................... 152/209.27
See application file for complete search history.

(56) References Cited

U.S. PATENT DOCUMENTS

| | | | | |
|---|---|---|---|---|
| 2010/0116393 | A1* | 5/2010 | Miyazaki | B60C 11/0306 152/209.18 |
| 2013/0118663 | A1* | 5/2013 | Kishizoe | B60C 11/12 152/209.18 |
| 2013/0133797 | A1 | 5/2013 | Takagi | |
| 2013/0292021 | A1* | 11/2013 | Tanaka | B60C 11/0306 152/209.22 |
| 2014/0090759 | A1* | 4/2014 | Tanaka | B60C 11/0306 152/209.8 |
| 2014/0283967 | A1 | 9/2014 | Inoue | |

FOREIGN PATENT DOCUMENTS

| | | | |
|---|---|---|---|
| EP | 2777949 A1 | | 9/2014 |
| JP | 09-226323 | * | 9/1997 |
| JP | 2003-094910 | * | 4/2003 |
| JP | 2003-226116 | * | 8/2003 |
| JP | 2007-153104 | * | 6/2007 |
| JP | 4145341 B1 | | 9/2008 |
| JP | 2014-184828 A | | 10/2014 |
| WO | WO 01/02194 A1 | | 1/2001 |

OTHER PUBLICATIONS

English machine translation of JP2003-094910. (Year: 2003).*
English machine translation of DE10311430. (Year: 2004).*
English machine translation of JP09-226323. (Year: 1997).*
English machine translation of JP2007-153104. (Year: 2007).*
Extended European Search Report issued in European Application No. 16190140.0 dated Mar. 13, 2017.

* cited by examiner

TIRE

BACKGROUND ART

Field of the Invention

The present invention relates to tires, and in particular relates to a pneumatic tire having an excellent noise performance while maintaining steering stability.

Description of the Related Art

In recent years, tires having excellent noise performance have been demanded. In order to improve noise performance of tires, it may be known lowering longitudinal spring constants of tire sidewalls, and/or decreasing the tread rubber hardness, for example.

Unfortunately, such a tire with low longitudinal spring constant and/or low tread rubber hardness tends to be deteriorated in steering stability.

SUMMARY OF THE INVENTION

In view of the above problems in the conventional art, the present invention has an object to provide a tire having an excellent noise performance while maintaining steering stability.

According to one aspect of the invention, a tire includes a tread portion having a designated installing direction to a vehicle to define an outboard tread edge and an inboard tread edge. The tread portion is provided with a plurality of circumferentially and continuously extending main grooves including an outboard shoulder main groove, an outboard middle main groove, an inboard shoulder main groove and an inboard middle main groove to define an outboard middle portion between the outboard shoulder main groove and the outboard middle main groove, an inboard middle portion between the inboard shoulder main groove and the inboard middle main groove, and a central portion between the outboard middle main groove and the inboard middle main groove. The central portion is provided with a circumferentially and continuously extending central sipe. The outboard middle portion is provided with a plurality of outboard middle lateral grooves extending between the outboard shoulder main groove and the outboard middle main groove, a plurality of outboard middle circumferential sipes each extending between adjacent outboard middle lateral grooves, and a plurality of outboard middle lateral sipes extending from the outboard shoulder main groove or the outboard middle main groove toward the outboard middle circumferential sipes without reaching the outboard middle circumferential sipes. The inboard middle portion is provided with a plurality of inboard middle lateral grooves extending between the inboard shoulder main groove and the inboard middle main groove, a plurality of inboard middle circumferential sipes each extending between adjacent inboard middle lateral grooves, and a plurality of inboard middle lateral sipes extending from the inboard shoulder main groove or the inboard middle main groove toward the inboard middle circumferential sipes without reaching the inboard middle circumferential sipes. The number of the inboard middle lateral sipes is greater than the number of the outboard middle lateral sipes.

In another aspect of the invention, depths of the outboard middle circumferential sipes and depths of the inboard middle circumferential sipes may be greater than depths of the central sipe.

In another aspect of the invention, at least one inboard middle circumferential sipe may include at least one shallow bottom portion at a location where the inboard middle circumferential sipe is in communication with one inboard middle lateral groove, and at least one outboard middle circumferential sipe may include at least one shallow bottom portion at a location where the outboard middle circumferential sipe is in communication with one outboard middle lateral groove.

In another aspect of the invention, the inboard middle lateral sipes may include a first inboard middle lateral sipe extending from the inboard shoulder main groove and a second inboard middle lateral sipe extending from the inboard middle main groove.

In another aspect of the invention, the first inboard middle lateral sipe may be substantially arranged on a virtual extension line in which the second inboard middle lateral sipe is smoothly extended toward the inboard shoulder main groove.

In another aspect of the invention, the outboard middle lateral sipes may extend from the outboard shoulder main groove.

In another aspect of the invention, the tread portion may further include an outboard shoulder portion between the outboard shoulder main groove and the outboard tread edge and an inboard shoulder portion between the inboard shoulder main groove and the inboard tread edge. The outboard shoulder portion may be provided with a plurality of outboard shoulder lug grooves extending axially inwardly from the outboard tread edge and terminating without reaching the outboard shoulder main groove, and the inboard shoulder portion may be provided with a plurality of inboard shoulder lug grooves extending axially inwardly from the inboard tread edge and terminating without reaching the inboard shoulder main groove and a plurality of inboard shoulder lateral sipes each extending between one inboard shoulder lug groove and the inboard shoulder main groove.

DESCRIPTION OF THE PREFERRED EMBODIMENTS

Figure 1:
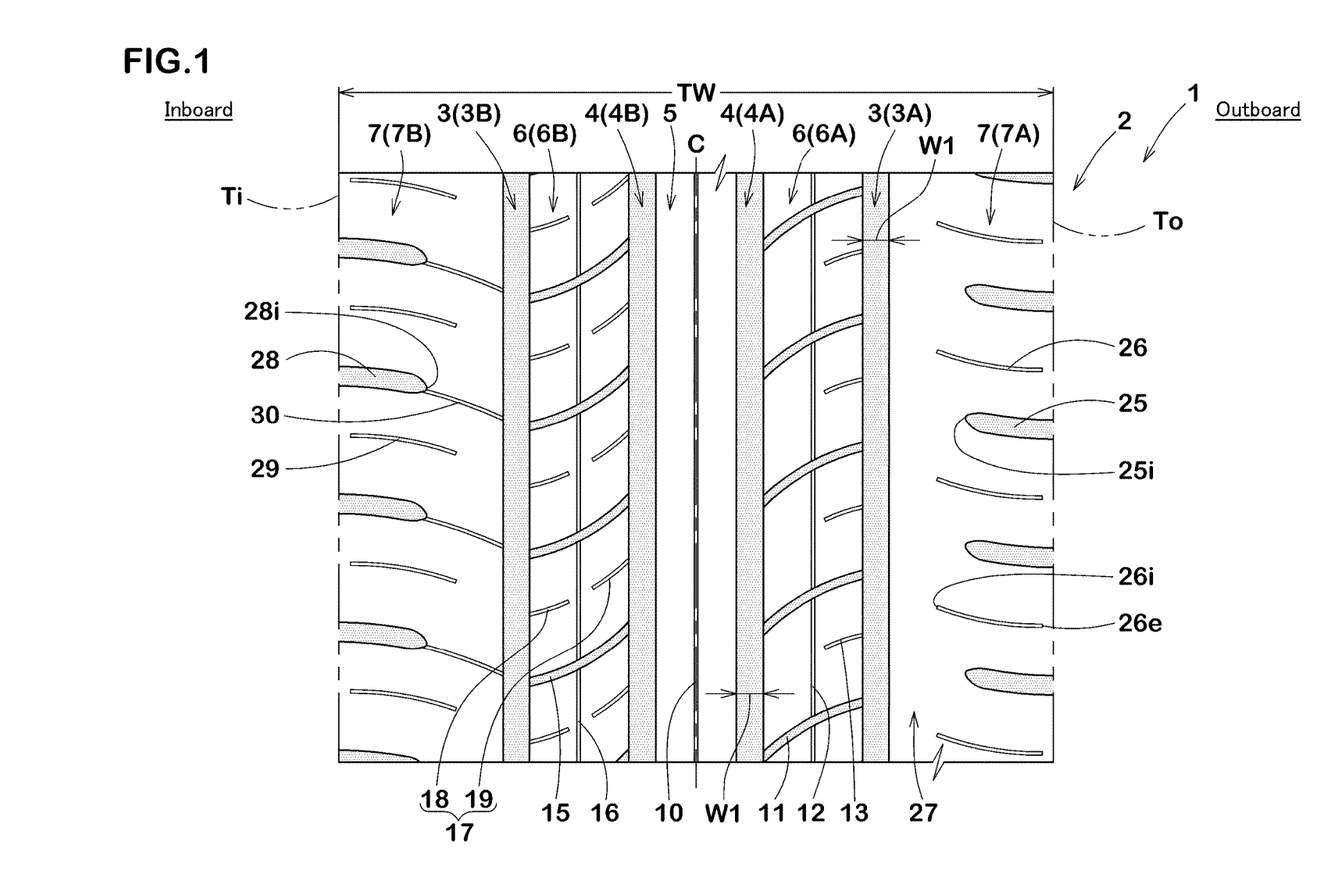
FIG. 1 is a development view of a tread portion of a tire according to an embodiment of the present invention.

An embodiment of the present invention will be explained below with reference to the accompanying drawings. FIG. 1 illustrates a development view of a tread portion 2 of a tire 1 in accordance with an embodiment of the present invention. The tire 1 may be configured as pneumatic tires and non-pneumatic tires, for example. In a preferred embodiment, the tire 1 can be embodied as a pneumatic tire for passenger vehicles or heavy duty vehicles, for example.

The tire 1 includes the tread portion 2 with a designated installing direction to a vehicle to define an outboard tread edge To and an inboard tread edge Ti. The outboard tread edge To is intended to use to be positioned on the side of the outboard when the tire is installed to a vehicle. On the other hand, the inboard tread edge Ti is intended to use to be positioned on the side of the inboard when the tire is installed to a vehicle. The installing direction to a vehicle may be indicated on a sidewall portion of the tire using a mark or characters (not illustrated), for example.

The respective tread edges To and Te are defined as axially outermost ends in a ground contact patch of the tread portion 2 under a standard loaded condition. The standard loaded condition is such that the tire 1 is mounted on a standard wheel rim (not illustrated) with a standard pressure, and is grounded with a standard tire load at a camber angle of zero. Also, unless otherwise stated, dimensions and the like of portions of the tire have values under a standard unloaded condition that the tire is mounted on the standard wheel rim and inflated to the standard pressure, but is loaded with no tire load.

As used herein, the axial distance between the tread edges To and Te is defined as the tread width TW.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of passenger vehicle tires, however, the standard pressure is uniformly defined as 180 kPa.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like. In case of passenger vehicle tires, however, the standard tire load is uniformly defined as an 88% load of the above mentioned load.

In this embodiment, the tread portion 2 is provided with a pair of circumferentially and continuously extending shoulder main grooves 3 and a pair of circumferentially and continuously extending middle main grooves 4 disposed between the shoulder main grooves 3.

The shoulder main grooves 3 include an outboard shoulder main groove 3A disposed on the side of the outboard tread edge To and an inboard shoulder main groove 3B disposed on the side of the inboard tread edge Ti. The middle main grooves 4 include an outboard middle main groove 4A disposed between the outboard shoulder main groove 3A and the tire equator C and an inboard middle main groove 4B disposed between the inboard shoulder main groove 3B and the tire equator C.

Each of the main grooves 3 and 4 extends in a straight manner along the circumferential direction of the tire. This configuration of grooves 3 and 4 may help to improve stability when braking.

Preferably, widths W1 of the main grooves 3 and 4 are in a range of from 2% to 9% the tread width TW in order to balance steering stability with noise performance by maintaining sufficient pattern rigidity. Preferably, depths D1 of the main grooves 3 and 4 are in a range of from 6 to 10 mm. Note that the widths and the depths are not particularly limited to the above mentioned ranges.

In this embodiment, the tread portion 2 is separated into a single central portion 5, a pair of middle portions 6 and a pair of shoulder portions 7 by the main grooves 3 and 4.

The central portion 5, for example, is defined between the outboard middle main groove 4A and the inboard middle main groove 4B. The middle portions 6, for example, include an outboard middle portion 6A defined between the outboard shoulder main groove 3A and the outboard middle main groove 4A and an inboard middle portion 6B defined between the inboard shoulder main groove 3B and the inboard middle main groove 4B. The shoulder portions 7, for example, include an outboard shoulder portion 7A defined between the outboard shoulder main groove 3A and the outboard tread edge To and an inboard shoulder portion 7B defined between the inboard shoulder main groove 3B and the inboard tread edge Ti.

In this embodiment, the central portion 5 is provided with a circumferentially and continuously extending central sipe 10. Since the central sipe 10 allows the central portion 5 to deform elastically by receiving ground contact pressure, it may prevent the generation of a standing wave of air flows that passes in the outboard middle main groove 4A as well as in the inboard middle main groove 4B so as to reduce an air columnar resonance. Note that a sipe means a narrow cut having a width of not less than 0.6 mm and less than 1.5 mm, and that a groove has a width not less than 1.5 mm.

In this embodiment, the central sipe 10 extends in a straight manner. Such a central sipe 10 may also maintain the circumferential rigidity to improve steering stability of the tire. Note that the central sipe 10 is not particularly limited to the above aspect, but may extend in a wavy or zigzag manner.

Figure 2:
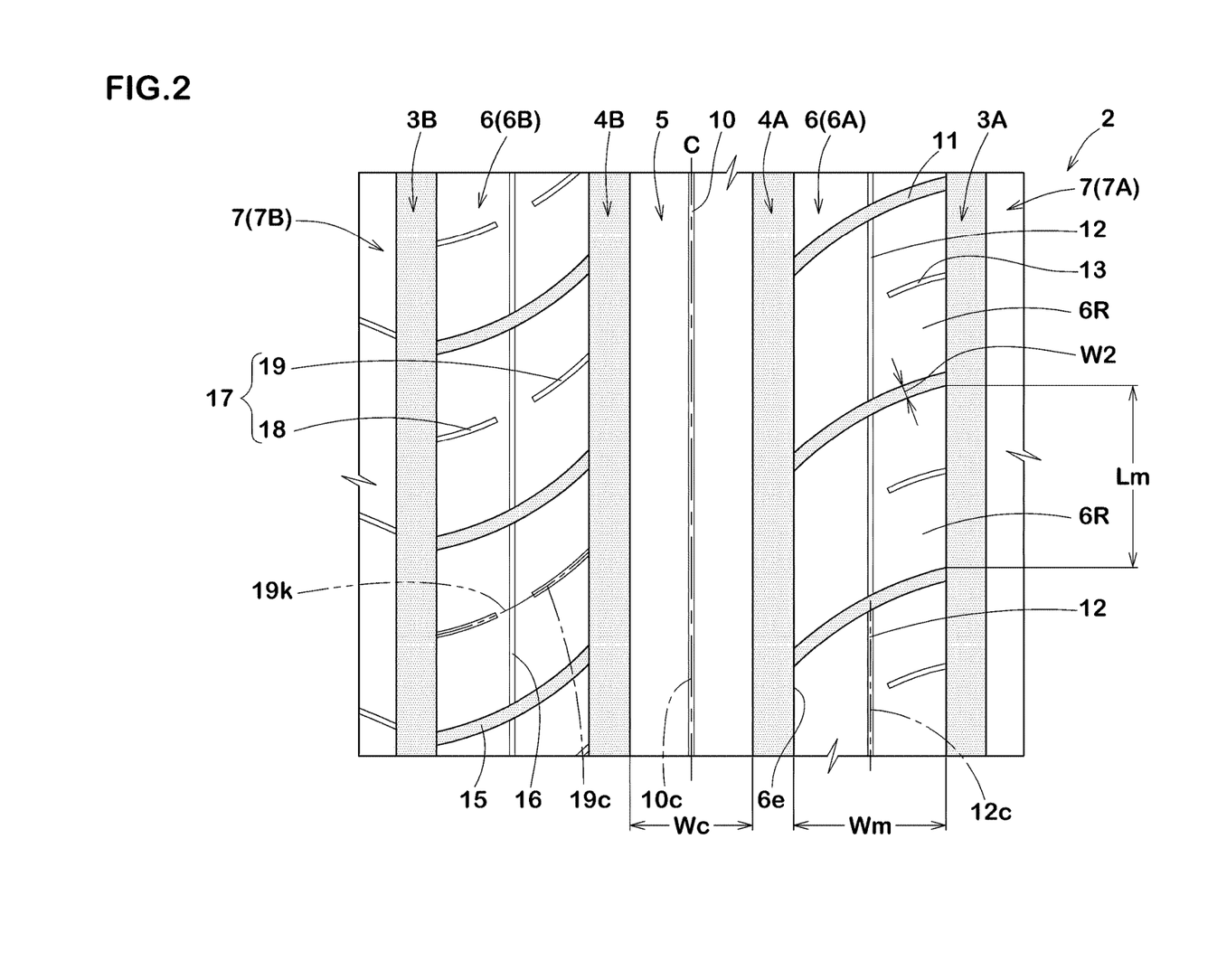
FIG. 2 is an enlarged view of a central portion and middle portions of the tread portion of FIG. 1.

As illustrated in FIG. 2, the central sipe 10 is located on the middle portion of the central portion 5 in the axial direction of the tire. In this embodiment, the central sipe 10 is located on the tire equator C. Thus, the axial rigidity on the left and right of the central portion 5 can be balanced so that steering stability can be ensured. Note that the "middle portion" of the central portion 5 means a centered region of the central portion 5 having an axial width of from 40% to 60% of the central portion 5.

The depth (not illustrated) of the central sipe 10 is preferably in a range of from 40% to 60% the depth of the outboard middle main groove 4A, although it is not particularly limited.

In this embodiment, the central portion 5 is not provided with any other grooves or sipes except the central sipe 10. Thus, the central portion 5 may have high rigidity to improve steering stability.

In this embodiment, the outboard middle portion 6A is provided with a plurality of outboard middle lateral grooves 11, a plurality of outboard middle circumferential sipes 12 and a plurality of outboard middle lateral sipes 13.

The outboard middle lateral grooves 11 extend between the outboard shoulder main groove 3A and the outboard middle main groove 4A to form a plurality of outboard middle blocks 6R. Since the outboard middle lateral grooves 11 allow the outboard middle portion 6A to deform largely by receiving ground contact pressure, it may prevent the generation of a standing wave of air flows that passes in the outboard middle main groove 4A as well as in the outboard shoulder main groove 3A so as to reduce air columnar resonance. Furthermore, the outboard middle portion 6A may tend to receive relatively low ground contact pressure as compared with the central portion 5. Thus, sufficient steering stability can be obtained while having the outboard middle lateral grooves 11.

The respective outboard middle lateral grooves 11 are inclined in the same direction with respect to the axial direction. Such an outboard middle lateral groove 11 can come into contact with the ground gradually, and thus the outboard middle lateral grooves 11 may prevent the air therein from being compressed suddenly but also being released suddenly. Accordingly, the tire in accordance with the present embodiment can reduce air pumping noise when traveling. In order to further improve the above mentioned effects, the outboard middle lateral grooves 11 preferably extend in an arc manner.

Preferably, widths W2 of the outboard middle lateral grooves 11 are in a range of from 5% to 15% the axial width Wm of the outboard middle blocks 6R, for example. Preferably, depths D2 (illustrated in FIG. 3) of the outboard middle lateral grooves 11 are in a range of from 40% to 60% the depth D1 of the outboard shoulder main groove 3A, for example.

The outboard middle circumferential sipes 12 extend between adjacent outboard middle lateral grooves 11 and 11. Thus, the outboard middle blocks 6R may deform suitably by receiving ground contact pressure since the outboard middle circumferential sipes 12 reduce the rigidity of the outboard middle blocks 6R.

In this embodiment, the outboard middle circumferential sipes 12 extend along the circumferential direction of the tire in a straight manner. Such an outboard middle circumferential sipe 12 may maintain the circumferential rigidity of the respective outboard middle blocks 6R. Note that the outboard middle circumferential sipes 12 are not particularly limited to the above aspect.

Preferably, each groove center line 12c of each outboard middle circumferential sipe 12 is located in an axial distance from 40% to 60% the axial width Wm of the outboard middle blocks 6R from one of the circumferential edges 6e of each outboard middle blocks 6R. Thus, the axial rigidity on the left and right of the respective outboard middle blocks 6R can be balanced.

Figure 3:
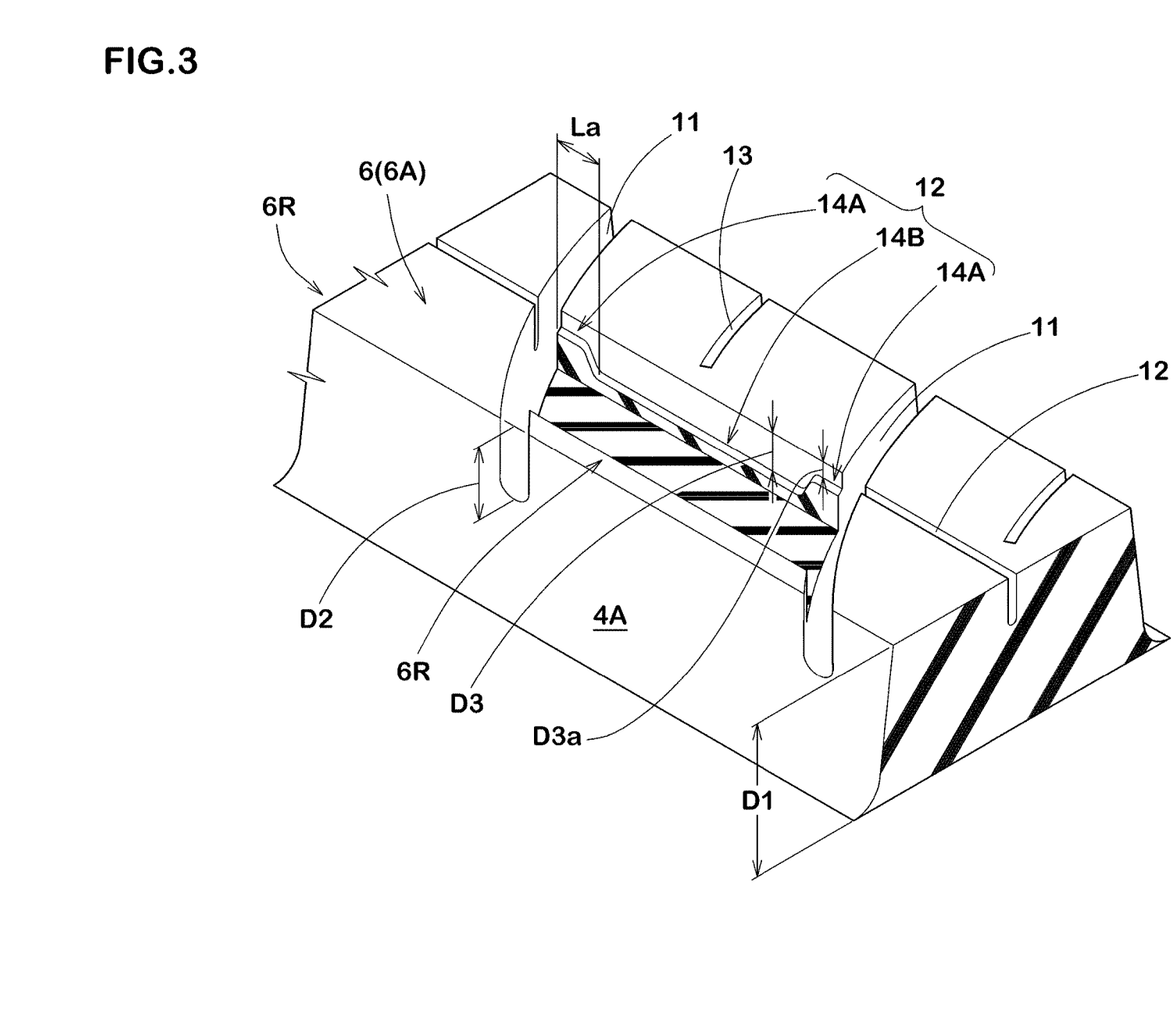
FIG. 3 is a perspective view of an outboard middle block of FIG. 1.

As illustrated in FIG. 3, at least one outboard middle circumferential sipes 12 includes at least one shallow bottom portion 14A and a deep bottom portion 14B having the maximal depth of the sipe.

In this embodiment, the shallow bottom portion 14A is disposed at a location where the outboard middle circumferential sipe 12 is in communication with outboard middle lateral grooves 11. That is, the outboard middle circumferential sipe 12 has a pair of shallow bottom portions 14A and 14A disposed on both circumferential end portions thereof. This configuration may improve noise performance while ensuring steering stability of the tire since the rigidity of the circumferential end portions of the outboard middle block 6R can be maintained while allowing deformation of the outboard middle block 6R.

In order to improve the steering stability and noise performance in good balance, depths D3a of the shallow bottom portions 14A are preferably in a range of from 20% to 50% the depth D3 of the deep bottom portion 14B. Furthermore, circumferential lengths La of the shallow bottom portions 14A are preferably in a range of from 20% to 30% the circumferential length Lm (shown in FIG. 2) of the outboard middle block 6R.

Preferably, the depth D3 of the deep bottom portion 14B of the outboard middle circumferential sipes 12 is greater than a depth (not illustrated) of the central sipe 10. Thus, the outboard middle blocks 6R can deform largely during traveling so that the generation of a standing wave of air flows in the main grooves is prevented. Furthermore, the rigidity of the central portion 5, which tends to receive large ground contact pressure, can be maintained. In view of the above, the depth D3 of the deep bottom portion 14B is preferably in a range of from 125% to 170% the depth of the central sipe 10.

As illustrated in FIG. 2, the outboard middle lateral sipes 13 extend from the outboard shoulder main groove 3A or the outboard middle main groove 4A toward the outboard middle circumferential sipes 12 without reaching the outboard middle circumferential sipes 12. Such an outboard middle lateral sipe 13 may allow the outboard middle blocks 6R to deform suitably while maintaining its rigidity. Furthermore, the outboard middle lateral sipes 13 as well as the outboard middle circumferential sipes 12 can close themselves when receiving ground contact pressure and/or lateral force so that sipe walls that face each other come into contact with each other. Thus, excessive deformation on the outboard middle blocks 6R can be prevented so that the steering stability can be ensured.

In this embodiment, all the outboard middle lateral sipes 13 extend from only the outboard shoulder main groove 3A. Namely, there are no outboard middle lateral sipes 13 extending from the outboard middle main groove 4A. This configuration may further improve the steering stability since the axially inner portions of the outboard middle blocks 6R which are located axially inward of the sipes 12 have relatively higher rigidity than the outer portions located axially outward of the sipes 12.

In this embodiment, the outboard middle lateral sipes 13 are inclined in the same direction as the outboard middle lateral grooves 11. Thus, excessive reduction in axial rigidity of the outboard middle blocks 6R can be prevented, thereby maintaining better steering stability. In this embodiment each outboard middle lateral sipe 13 extends in an arc shaped manner so as to convex toward a circumferential direction of the tire.

Preferably, each outboard middle lateral sipe 13 may be disposed on a circumferential middle region of each outboard middle block 6R, more preferably be located in a distance of from 40% to 60% the circumferential length Lm of the outboard middle block 6R from one of outboard middle lateral grooves 11. This would provide a pair of block pieces of on each outboard middle block 6R, which are divided by an outboard middle lateral sipe 13, with better circumferential rigidity balance.

In this embodiment, the inboard middle portion 6B is provided with a plurality of inboard middle lateral grooves 15, a plurality of inboard middle circumferential sipes 16 and a plurality of inboard middle lateral sipes 17. The inboard middle lateral grooves 15 and the inboard middle circumferential sipes 16 are respectively configured as point symmetrical shapes of the outboard middle lateral grooves 11 and the outboard middle circumferential sipes 12 with respect to an arbitrary point on the tire equator C. Thus, detail explanation of both the inboard middle lateral grooves 15 and the inboard middle circumferential sipes 16 are omitted.

The number of the inboard middle lateral sipes 17 is set greater than the number of the outboard middle lateral sipes 13. Thus, circumferential rigidity of the outboard middle portion 6A, which tends to receive large lateral force when cornering, can be maintained higher than that of the inboard middle portion 6B. Accordingly, the tire can improve steering stability. On the other hand, since relatively many inboard middle lateral sipes 17 can allow the inboard middle portion 6B to deform more easily, it can reduce the generation of a standing wave of air flows that passes in the inboard shoulder main groove 3B as well as in the inboard middle main groove 4B so that noise performance of the tire is improved.

The inboard middle lateral sipes 17 include at least one first inboard middle lateral sipe 18 extending from the inboard shoulder main groove 3B and at least one second inboard middle lateral sipe 19 extending from the inboard middle main groove 4B.

Preferably, a plurality of first inboard middle lateral sipes 18 is provided and at least partially of each sipe 18 is substantially arranged on each virtual extension line 19k in which each centerline 19c of each second inboard middle lateral sipe 19 is smoothly extended toward the inboard shoulder main groove 3B. Such an arrangement of sipes of the first inboard middle lateral sipes 18 and the second inboard middle lateral sipes 19 can allow the inboard middle portion 6B to deform more effectively, thereby improving noise performance of the tire. In a preferred embodiment, each first inboard middle lateral sipe 18 is arranged on each virtual extension line 19k in an axial direction of not less than 30% the axial length of the first inboard middle lateral sipe 18. In this embodiment, each first inboard middle lateral sipe 18, over the entire length, extends on each virtual line 19k.

Preferably, depths of the second inboard middle lateral sipes 19 are smaller than depths of the first inboard middle lateral sipes 18 in order to further improve steering stability of the tire by suppressing reduction of circumferential rigidity of the axially inner portion of the inboard middle portion 6B which tends to receive large ground contact pressure.

As illustrated in FIG. 1, the outboard shoulder portion 7A is provided with a plurality of outboard shoulder lug grooves 25 and a plurality of the outboard shoulder lug sipes 26.

The outboard shoulder lug grooves 25 extend axially inwardly from the outboard tread edge To and terminate without reaching the outboard shoulder main groove 3A. In this embodiment, each outboard shoulder lug grooves 25 is inclined at an angle with respect to the axial direction of the tire. Such an outboard shoulder lug groove 25 may reduce air pumping noise of the tire during traveling.

In this embodiment, each outboard shoulder lug sipe 26 is arranged between circumferentially adjacent outboard shoulder lug grooves 25 and 25.

The outboard shoulder lug sipes 26, for example, include axially inner ends 26i and axially outer ends 26e both of which are terminated within the outboard shoulder portion 7A to form closed sipes. The outboard shoulder lug sipes 26 may reduce the impact noise to be generated by the outboard shoulder portion 7A impacting the ground when traveling, thereby improving noise performance. The axially inner ends 26i of the outboard shoulder lug sipes 26 are preferably located axially inwardly of the axially inner ends 25i of the outboard shoulder lug grooves 25. This configuration can prevent uneven wear of an inner portion 27 of the outboard shoulder portion 7A located axially inwardly of the outboard shoulder lug grooves 25.

In this embodiment, the inner portion 27 of the outboard shoulder portion 7A is configured as a plain region where any sipes or grooves are not provided. Such an inner portion 27 can further improve steering stability of the tire.

In this embodiment, the inboard shoulder portion 7B is provided with a plurality of inboard shoulder lug grooves 28, a plurality of inboard shoulder lug sipes 29 and a plurality of inboard shoulder lateral sipes 30.

The inboard shoulder lug grooves 28 and the inboard shoulder lug sipes 29 are respectively configured as point symmetrical shapes of the outboard shoulder lug grooves 25 and the outboard shoulder lug sipes 26 with respect to an arbitrary point on the tire equator C. Thus, detail explanation of both the inboard shoulder lug grooves 28 and the inboard shoulder lug sipes 29 are omitted.

The inboard shoulder lateral sipes 30 extend from the axially inner ends 28i of the inboard shoulder lug grooves 28 to the inboard shoulder main groove 3B. The inboard shoulder lateral sipes 30 may deform the axially inner sidewall of the inboard shoulder portion 7B easily when grounding so that the generation of a standing wave of air flows in the inboard shoulder main groove 3B is prevented.

While the particularly preferable embodiments in accordance with the present invention have been described in detail, the present invention is not limited to the illustrated embodiments, but can be modified and carried out in various aspects.

Example

Pneumatic tires (215/65R16) having a basic tread pattern illustrated in FIG. 1 were manufactured based on the detail shown in Table 1, and then steering stability and noise performance of each tire was tested. Common specification and test method are as follows:
Rim: 16×6.5J
Tire inner pressure: 240 kPa
Depths of outboard middle circumferential sipes are set equal to depths of inboard middle circumferential sipes.
Depths of outboard middle lateral sipes and first inboard middle lateral sipes: 5.7 mm
Depths of outboard middle lateral grooves and inboard middle lateral grooves: 4.0 mm
Ratio of widths of outboard middle lateral grooves to axial width of outboard middle portion: 9%
Ratio of widths of inboard middle lateral grooves to axial width of inboard middle portion: 9%
Steering Stability Test:
Each test tire was mounted on a test FF vehicle having a displacement of 2,000 cc as the all wheels, and then a driver drove the test vehicle on a tire test course with a dry asphalt surface to evaluate the steering stability, e.g. steering response, linearity on lane-changing, grip and the like at speeds of ranging from 40 to 120 km/h by his sense. The test results are shown in Table 1 with a score based on Ref. 1 being 100. The larger the value, the better the performance is.
Noise Performance Test:
The foregoing test vehicle was run at speeds of ranging from 60 to 100 km/h on a dry asphalt road, and in-vehicle noise having frequency ranges of from 100 to 160 Hz was picked up through a microphone installed near the driver's head. The test results are shown in Table 1 with an index of 100 representing a value in Ref. 1 so that the larger the value, the better the performance is.

Test results are provided in Table 1.

TABLE 1

Figure 5:
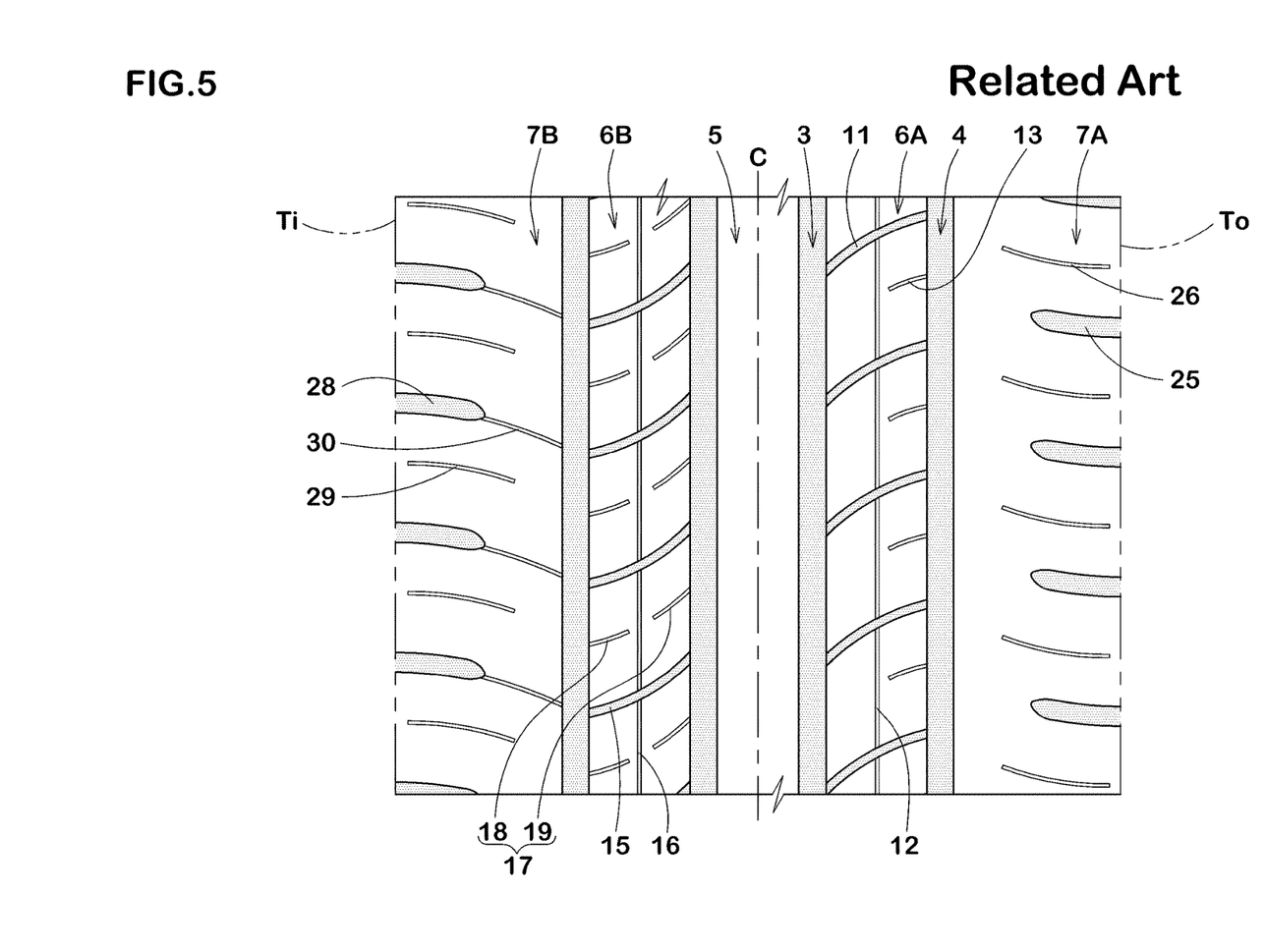
FIG. 5 is a development view of a tread portion in accordance with another comparative example.
Figure 6:
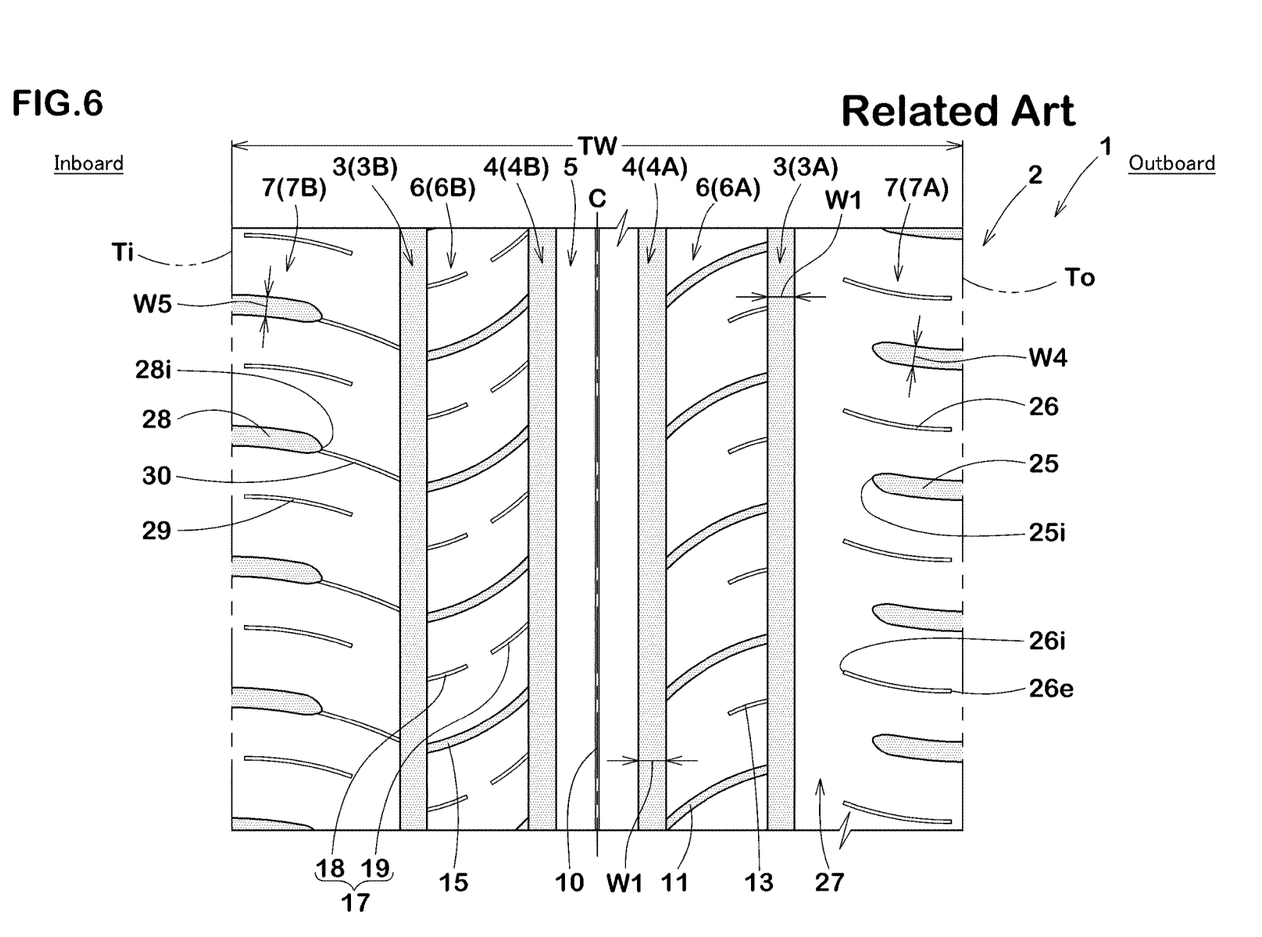
FIG. 6 is a development view of a tread portion in accordance with yet another comparative example.

|  | Ref. 1 | Ref. 3 | Ex. 1 | Ex. 2 | Ex. 3 | Ex. 4 | Ex. 5 |
|---|---|---|---|---|---|---|---|
| Tread pattern | FIG. 5 | FIG. 6 | FIG. 1 | FIG. 1 | FIG. 1 | FIG. 1 | FIG. 1 |
| Maximum depths D3 of outboard middle circumferential sipes (mm) | 5.7 | — | 5.7 | 5.7 | 5.7 | 5.7 | 5.7 |
| Depths of central sipe (mm) | — | 4.0 | 4.0 | 3.0 | 3.5 | 4.5 | 5.0 |
| Depths D3a of shallow bottom portions of outboard middle circumferential sipes (mm) | 2.0 | — | 2.0 | 2.0 | 2.0 | 2.0 | 2.0 |
| Depths of second inboard middle lateral sipes (mm) | 3.8 | 3.8 | 3.8 | 3.8 | 3.8 | 3.8 | 3.8 |
| Steering stability (score) | 100 | 98 | 102 | 101 | 102 | 101 | 100 |
| Noise performance (index) | 100 | 103 | 110 | 108 | 110 | 110 | 109 |

Figure 4:
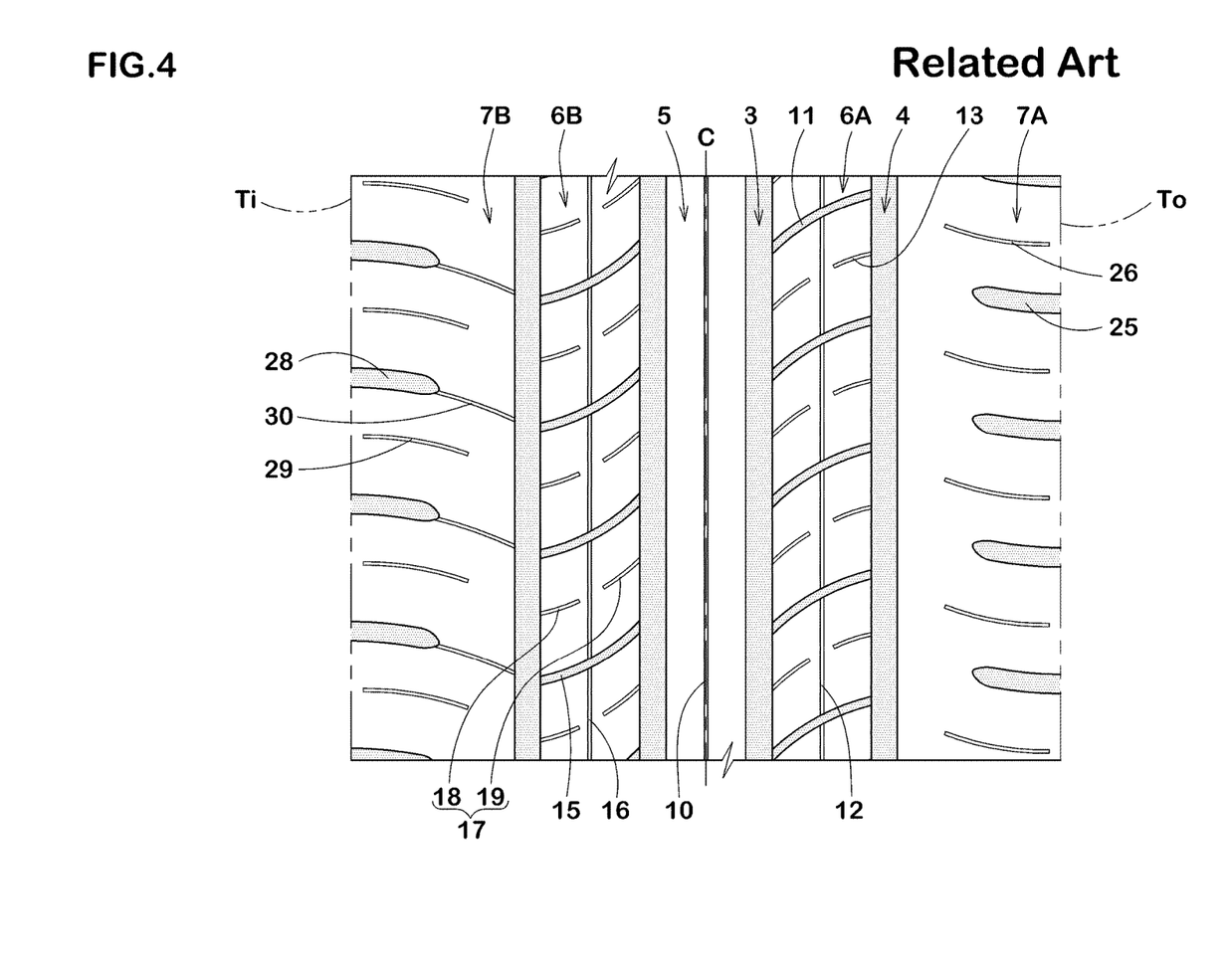
FIG. 4 is a development view of a tread portion of a tire in accordance with a comparative example.

|  | Ex. 6 | Ex. 7 | Ex. 8 | Ex. 9 | Ex. 10 | Ex. 11 | Ref. 2 |
|---|---|---|---|---|---|---|---|
| Tread pattern | FIG. 1 | FIG. 1 | FIG. 1 | FIG. 1 | FIG. 1 | FIG. 1 | FIG. 4 |
| Maximum depths D3 of outboard middle circumferential sipes (mm) | 5.7 | 5.7 | 5.7 | 5.7 | 5.7 | 5.7 | 5.7 |
| Depths of central sipe (mm) | 4.0 | 4.0 | 4.0 | 4.0 | 4.0 | 4.0 | 4.0 |
| Depths D3a of shallow bottom portions of outboard middle circumferential sipes (mm) | 0.5 | 1.2 | 2.8 | 3.5 | 2.0 | 2.0 | 2.0 |
| Depths of second inboard middle lateral sipes (mm) | 3.8 | 3.8 | 3.8 | 3.8 | 5.5 | 6.0 | 3.8 |
| Steering stability (score) | 103 | 102 | 101 | 99 | 100 | 99 | 93 |
| Noise performance (index) | 107 | 109 | 110 | 111 | 111 | 112 | 109 |

From the test results, it is confirmed that the example tires improve noise performance effectively while preventing reduction of steering stability, compared with the comparative example tires. Furthermore, the same trend was confirmed in another test which was conducted using different tire size to the above.

What is claimed is:

1. A tire comprising:
   a tread portion having a designated installing direction to a vehicle to define an outboard tread edge and an inboard tread edge;
   the tread portion being provided with a plurality of circumferentially and continuously extending main grooves comprising an outboard shoulder main groove, an outboard middle main groove, an inboard shoulder main groove and an inboard middle main groove to define an outboard middle portion between the outboard shoulder main groove and the outboard middle main groove, an inboard middle portion between the inboard shoulder main groove and the inboard middle main groove, and a central portion between the outboard middle main groove and the inboard middle main groove;
   the central portion being provided with a circumferentially and continuously extending central sipe;
   the outboard middle portion being provided with a plurality of outboard middle lateral grooves extending between the outboard shoulder main groove and the outboard middle main groove, a plurality of outboard middle circumferential sipes each extending between adjacent outboard middle lateral grooves, and a plurality of outboard middle lateral sipes extending from the outboard shoulder main groove toward the outboard middle circumferential sipes without reaching the outboard middle circumferential sipes;
   the inboard middle portion being provided with a plurality of inboard middle lateral grooves extending between the inboard shoulder main groove and the inboard middle main groove, a plurality of inboard middle circumferential sipes each extending between adjacent inboard middle lateral grooves, and a plurality of inboard middle lateral sipes extending from the inboard shoulder main groove or the inboard middle main groove toward the inboard middle circumferential sipes without reaching the inboard middle circumferential sipes; and
   the number of the inboard middle lateral sipes being greater than the number of the outboard middle lateral sipes,
   wherein the number of the plurality of outboard middle lateral grooves is same as the number of the plurality of inboard middle lateral grooves, the number of plurality of outboard middle circumferential sipes is same as the number of the plurality of inboard middle circumferential sipes, and no sipe that extends from the outboard middle main groove is provided on the outboard middle portion.

2. The tire according to claim 1, wherein depths of the outboard middle circumferential sipes and depths of the inboard middle circumferential sipes are greater than depth of the central sipe.

3. The tire according to claim 1,
   wherein at least one inboard middle circumferential sipe comprises at least one shallow bottom portion at a location where the inboard middle circumferential sipe is in communication with one inboard middle lateral groove, and
   wherein at least one outboard middle circumferential sipe comprises at least one shallow bottom portion at a location where the outboard middle circumferential sipe is in communication with one outboard middle lateral groove.

4. The tire according to claim 1, wherein the inboard middle lateral sipes comprise a first inboard middle lateral sipe extending from the inboard shoulder main groove and a second inboard middle lateral sipe extending from the inboard middle main groove.

5. The tire according to claim 4, wherein the first inboard middle lateral sipe is substantially arranged on a virtual extension line in which the second inboard middle lateral sipe is smoothly extended toward the inboard shoulder main groove.

6. The tire according to claim 1, wherein
the tread portion further comprises an outboard shoulder portion between the outboard shoulder main groove and the outboard tread edge and an inboard shoulder portion between the inboard shoulder main groove and the inboard tread edge,
the outboard shoulder portion is provided with a plurality of outboard shoulder lug grooves extending axially inwardly from the outboard tread edge and terminating without reaching the outboard shoulder main groove, and
the inboard shoulder portion is provided with a plurality of inboard shoulder lug grooves extending axially inwardly from the inboard tread edge and terminating without reaching the inboard shoulder main groove and a plurality of inboard shoulder lateral sipes each extending between one inboard shoulder lug groove and the inboard shoulder main groove.

7. The tire according to claim 6, wherein no sipe that extends from an axially inner end of each of the plurality of outboard shoulder lug grooves is provided on the outboard shoulder portion.

8. The tire according to claim 1, wherein no sipe is provided between a respective one of the plurality of outboard middle circumferential sipe and the outboard middle main groove.

9. The tire according to claim 1, wherein the central portion is not provided with any sipes or grooves except the central sipe.

10. The tire according to claim 1, wherein each sipe has a width less than each groove, and each sipe has a width of less than 1.5 mm.

11. A tire comprising:
a tread portion having a designated installing direction to a vehicle to define an outboard tread edge and an inboard tread edge;
the tread portion being provided with a plurality of circumferentially and continuously extending main grooves comprising an outboard shoulder main groove, an outboard middle main groove, an inboard shoulder main groove and an inboard middle main groove to define an outboard middle portion between the outboard shoulder main groove and the outboard middle main groove, an inboard middle portion between the inboard shoulder main groove and the inboard middle main groove, and a central portion between the outboard middle main groove and the inboard middle main groove;
the central portion being provided with a circumferentially and continuously extending central sipe;
the outboard middle portion being provided with a plurality of outboard middle lateral grooves extending between the outboard shoulder main groove and the outboard middle main groove, a plurality of outboard middle circumferential sipes each extending between adjacent outboard middle lateral grooves, and a plurality of outboard middle lateral sipes extending from the outboard shoulder main groove toward the outboard middle circumferential sipes without reaching the outboard middle circumferential sipes;
the inboard middle portion being provided with a plurality of inboard middle lateral grooves extending between the inboard shoulder main groove and the inboard middle main groove, a plurality of inboard middle circumferential sipes each extending between adjacent inboard middle lateral grooves, and a plurality of inboard middle lateral sipes extending from the inboard shoulder main groove or the inboard middle main groove toward the inboard middle circumferential sipes without reaching the inboard middle circumferential sipes; and
the number of the inboard middle lateral sipes being greater than the number of the outboard middle lateral sipes,
wherein the number of the plurality of outboard middle lateral grooves is same as the number of the plurality of inboard middle lateral grooves, the number of plurality of outboard middle circumferential sipes is same as the number of the plurality of inboard middle circumferential sipes, and no sipe is provided between a respective one of the plurality of outboard middle circumferential sipes and the outboard middle main groove.

12. A tire comprising:
a tread portion having a designated installing direction to a vehicle to define an outboard tread edge and an inboard tread edge;
the tread portion being provided with a plurality of circumferentially and continuously extending main grooves comprising an outboard shoulder main groove, an outboard middle main groove, an inboard shoulder main groove and an inboard middle main groove to define an outboard middle portion between the outboard shoulder main groove and the outboard middle main groove, an inboard middle portion between the inboard shoulder main groove and the inboard middle main groove, and a central portion between the outboard middle main groove and the inboard middle main groove;
the central portion being provided with a circumferentially and continuously extending central sipe and not being provided with any sipes or grooves except the central sipe;
the outboard middle portion being provided with a plurality of outboard middle lateral grooves extending between the outboard shoulder main groove and the outboard middle main groove, a plurality of outboard middle circumferential sipes each extending between adjacent outboard middle lateral grooves, and a plurality of outboard middle lateral sipes extending from the outboard shoulder main groove or the outboard middle main groove toward the outboard middle circumferential sipes without reaching the outboard middle circumferential sipes;
the inboard middle portion being provided with a plurality of inboard middle lateral grooves extending between the inboard shoulder main groove and the inboard middle main groove, a plurality of inboard middle circumferential sipes each extending between adjacent inboard middle lateral grooves, and a plurality of inboard middle lateral sipes extending from the inboard shoulder main groove or the inboard middle main groove toward the inboard middle circumferential sipes without reaching the inboard middle circumferential sipes; and
the number of the inboard middle lateral sipes being greater than the number of the outboard middle lateral sipes,
wherein the number of the plurality of outboard middle lateral grooves is same as the number of the plurality of inboard middle lateral grooves, and the number of plurality of outboard middle circumferential sipes is same as the number of the plurality of inboard middle circumferential sipes.

* * * * *